(12) United States Patent
Albrecht et al.

(10) Patent No.: US 7,090,879 B2
(45) Date of Patent: Aug. 15, 2006

(54) NUTRITIONAL FORMULA CONTAINING SELECT CAROTENOID COMBINATIONS

(75) Inventors: Daniel S. Albrecht, Columbus, OH (US); Nancy Auestad, Powell, OH (US); Jeffrey M. Boff, Dubin, OH (US); Amy Mackey, Columbus, OH (US)

(73) Assignee: Abbott Laboratories, Abbott Park, IL (US)

( * ) Notice: Subject to any disclaimer, the term of this patent is extended or adjusted under 35 U.S.C. 154(b) by 185 days.

(21) Appl. No.: 10/803,485

(22) Filed: Mar. 18, 2004

(65) Prior Publication Data

US 2005/0208179 A1   Sep. 22, 2005

(51) Int. Cl.
*A23L 1/303* (2006.01)

(52) U.S. Cl. .......................... 426/72; 426/73; 426/262; 426/601; 426/801

(58) Field of Classification Search ................ 426/72, 426/601, 262, 801
See application file for complete search history.

(56) References Cited

U.S. PATENT DOCUMENTS

| | | | |
|---|---|---|---|
| 5,234,702 | A | 8/1993 | Katz |
| 6,261,598 | B1 | 7/2001 | Runge |
| 6,455,072 | B1 | 9/2002 | Peters |
| 6,509,029 | B1 | 1/2003 | Runge |
| 6,727,373 | B1 * | 4/2004 | Bijl et al. ...................... 554/8 |
| 2001/0019724 | A1 | 9/2001 | Runge |
| 2002/0132800 | A1 | 9/2002 | Popp |
| 2003/0228392 | A1 * | 12/2003 | Zimmer ...................... 426/73 |

FOREIGN PATENT DOCUMENTS

| | | |
|---|---|---|
| EP | 0 981 969 A1 | 8/1999 |
| WO | WO 02/41711 A1 | 5/2002 |

OTHER PUBLICATIONS

Lycopene, Natural Food Colorants: Science and Technology, Minhthy L. Nguyen and Steven Schwartz, Ohio State University, 2000.
Methods and Compositions for Brightening the Color of Thermally Processed Nutritionals, Nguyen, et al, U.S. Appl. No. 10/012,353, filed Dec. 12, 2001.
Identification, Quantification, and Relative Concentrations of Carotenoids and Their Metabolites in Human Milk and Serum, Khachik, et al, Analytical Chemistry, vol. 69, No. 10, May 15, 1997.
Carotenoids: functionis and fallacies, David I. Thernham, Proceedings of the Nutrition Society (1994), 53, 77-87.

(Continued)

*Primary Examiner*—Helen Pratt
(74) *Attorney, Agent, or Firm*—William J. Winter; Thomas D. Brainard

(57) ABSTRACT

Disclosed are nutritional formulas, including reconstitutable powders, comprising carbohydrate, protein and a lipid component containing a polyunsaturated fatty acid; and from about 0.25 to about 10 ppm, by weight of the total oil content of the infant formula, of a combination of lutein, lycopene, and beta-carotene with preferred weight ratios of the lutein to beta-carotene of from about 0.0196:1 to about 59:1, the lycopene to beta-carotene of from about 0.00805:1 to about 114:1, and the lutein to lycopene of from about 0.0117:1 to about 108:1. Also disclosed are methods of providing nutrition using the disclosed formulas. The nutritional formulas provide improved product stability and color characteristics.

36 Claims, 3 Drawing Sheets

OTHER PUBLICATIONS

Antioxidant Activity of β-Carotene-Related Carotenoids in Solution, LIPIDS, vol. 24, No. 7 (1989).

Chromatographic analysis of cis/trans carotenoid isomers, O'Neil, et al, Journal of Chromatography, 624 (1992) 235-252.

Structure and Properties of Carotenoids in Relation to Function, George Britton, FASEB, vol. 9, Dec. 1995, 1551-1558.

Lutein in Patients with Cataracts and Age-Related Macular Degeneration: A Long-Term Supplementation Study, Olmedilla, et al, Journal of the Science of Food and Agriculture, 2001.

Red Palm Oil in the Maternal Diet Increases Provitamin A Carotenoids in Breastmilk and Serum of the Mother-Infant Dyad, Eur. Journal of Nutr. 40: 30-38 (2001).

Changes in the Concentration of Carotenoids, Vitamin A, Alpha-Tocopherol and Total Lipids in Human Milk throughout Early Lactation, Consuelo Macias, Annals of Nutrition & Metabolism, 2001; 45:82-85.

Carotenoid Supply in Breat-fed and Formula-fed Neonates, Sommerburg, et al, Eur J. Pediatr (2000) 159: 86-90.

Carotino Fact Sheets from Carotino.com, May 4, 2003.

What are Natural Carotenoids? Wyeth, The Pediatric Nutrition Network, May 4, 2003.

Carotenoid Composition of Human Milk During the First Month Postpartum and the Response to β-Carotene Supplementation, Gossage, et al, Am J. Clin Nutr. 2002; 76:193-7.

Antioxidant Activities of Astaxanthin and Related Carotenoids, Yousry Naguib, J. Agric. Food Chem. 2000, 48, 1150-1154.

Carotenoid Supply in Breast-fed and Formula-fed Neonates, Sommerberg, et al, Eur J Pediatr (2000) 159: 86-90.

Research and Development, Wyeth Nutritionals, Aug. 13, 2002.

Carotenoids Come of Age, Yousry Nabuid, Functional Foods & Nutraceuticals, Mar. 2003.

* cited by examiner

NUTRITIONAL FORMULA CONTAINING SELECT CAROTENOID COMBINATIONS

TECHNICAL FIELD

The present invention relates to nutritional compositions or formulas containing select combinations of carotenoids for improved oxidative stability and color performance.

BACKGROUND OF THE INVENTION

Nutritional formulas today are well known for a variety of nutritional or disease specific applications in infants, children and adults. These formulas most typically contain a balance of proteins, carbohydrates, lipids, vitamins, and minerals tailored to the nutritional needs of the intended user, and include product forms such as ready-to-drink liquids, reconstitutable powders, nutritional bars, and others.

Among the many nutritional formulas commercially available today, infant formulas have become particularly well known and commonly used in providing a supplemental or sole source of nutrition early in life. Although human milk is generally accepted as a superior nutritional source for most if not all infants, many infant nutritional formulas can still provide a quality alternative for those mothers who cannot breastfeed or choose not to under their particular circumstances. These infant formulas typically contain proteins, carbohydrates, lipids, vitamins, minerals, and other nutrients, and are commercially and most typically available as reconstitutable powders, ready-to-feed liquids, and dilutable liquid concentrates.

Many nutritional formulas, especially infant formulas, commonly contain a variety of polyunsaturated chain fatty acids (PUFA) as part of the lipid component of the overall nutrient system, examples of which include linoleic acid, alpha-linolenic acid, eicosapentaenoic acid (EPA), arachidonic acid (ARA), decosahexaenoic acid (DHA), and others. A growing body of evidence even suggests the intake of certain long chain polyunsaturated fatty acids may be beneficial or even essential for certain groups. For example, some PUFAs have been shown beneficial in the prevention and management of cardiovascular disease, rheumatoid arthritis, asthma, other inflammation related diseases, and cancer cachexia.

Arachidonic and decosahexaenoic acids in particular have been shown to provide beneficial effects in preterm infants such as enhanced brain and vision development, and are now commonly found in many commercially available infant formulas such as Similac® Advance® Infant Formula and Isomil® Advance® Infant formula, both of which are available from Ross Products Division, Abbott Laboratories, Columbus, Ohio, USA.

These polyunsaturated fatty acids, however, tend to be more sensitive to oxidation than many other ingredients commonly found in nutritional formulas. Due to their chemical structure, exposure to heat and atmospheric levels of oxygen can cause a series of chemical reactions about their carbon:carbon double bonds resulting in free radical formation. These free radicals can continue to break down the polyunsaturated fatty acids in an auto-oxidative process. The result is the development of undesirable off-flavors and odors and the eventual degradation of the beneficial polyunsaturated fatty acids. These polyunsaturated fatty acids are especially susceptible to oxidation during high-heat processing, spray drying processing, or even during relatively short storage periods after the formula has been sealed and packaged. Oxidative stability has become especially challenging with recent infant formulas that contain relatively high concentrations of arachidonic and decosahexaenoic acid for optimal eye and cognitive development.

One method of controlling the undesirable oxidation of polyunsaturated fatty acids in nutritional formulas, especially in powder formulas, is the addition of antioxidants such as those described in U.S. Pat. No. 5,234,702 (Katz et al.) including ascorbyl palmitate, beta-carotene, mixed tocopherols, and others. Beta-carotene has been found particularly useful as an antioxidant in the oil blends described by Katz et al., and includes antioxidant systems in which beta-carotene is used at concentrations ranging from 6–12 ppm by weight of the total oil content of the infant formula.

As an antioxidant, however, beta-carotene tends to discolor the otherwise white-appearing nutritional formula, especially infant formulas, with a red-orange carotenoid hue. These colors can stain clothing and are often viewed as a negative by many consumers. Although off colors can be eliminated by simply removing the beta-carotene from the formula, such removal is not generally desirable from a nutrition standpoint, and will also generally result in an unacceptable reduction in oxidation stability within the formula, with the subsequent development of rancid odors especially in those powder formulations containing ARA and DHA.

It has now been found, however, that nutritional formulas containing polyunsaturated fatty acids can be formulated with beta-carotene for optimal antioxidant performance without imparting to the finished product a carotenoid-like red-orange hue. This has been accomplished by preparing a nutritional formula with carbohydrate, protein, lipid, and from 0.25 ppm to 10 ppm of a carotenoid-containing antioxidant combination by weight of the total oil component of the formula, wherein the carotenoid combination comprises beta-carotene, lutein, and lycopene, at preferred weight ratios of (i) lutein to beta-carotene of from about 0.01966:1 to about 59:1, (ii) lycopene to beta-carotene of from about 0.00805:1 to about 114:1, and (iii) lutein to lycopene of from about 0.0117:1 to about 108:1.

The data as set forth herein shows selected carotenoid combinations can provide the same or better antioxidant performance as antioxidant systems containing up to six times as much beta-carotene as total carotenoid in the infant formulations of the present invention. Moreover, it has also been shown from the data that this particular combination of carotenoids also greatly reduces the red-orange carotenoid hue in the finished formula, without a corresponding reduction in antioxidant activity.

It is therefore an object of the present invention to provide nutritional formulas, especially infant formulas, containing a polyunsaturated fatty acid with an effective antioxidant system, and further to provide such a system that contains a carotenoid-containing antioxidant. It is a further object of the present invention to provide such a formula, wherein the formula has improved color, with little or no red-orange carotenoid hue. It is yet another object of the present invention to provide such a formula containing relatively high concentrations of polyunsaturated fatty acids, especially a combination including arachidonic, eicosapentaenoic, and/or decosahexaenoic acids. It is a further object of the present invention to provide such benefits in a powder nutritional formula.

SUMMARY OF THE INVENTION

The present invention is directed to nutritional formulas, including powder infant formulas, comprising carbohydrate, protein, and lipid, wherein the lipid contains a polyunsaturated fatty acid; and from about 0.25 to about 10 ppm, by weight of the total oil content of the formula, of a combination of lutein, lycopene, and beta-carotene at the following weight ratios: (i) lutein to beta-carotene of from about 0.01966:1 to about 59:1, (ii) lycopene to beta-carotene of from about 0.00805:1 to about 114:1, and (iii) lutein to lycopene of from about 0.0117:1 to about 108:1.

The present invention is also directed to a nutritional formula, including a powder nutritional formula, comprising carbohydrate, protein, and lipid, wherein the lipid contains arachidonic acid, linoleic acid, linolenic acid, eicosapentaenoic acid, decosahexaenoic acid, or combinations thereof; and from about 0.25 to about 10 ppm, by weight of the total oil content of the formula, of a combination of lutein, lycopene, and beta-carotene.

The present invention is also directed to methods of providing nutrition to an infant, child, or adult, said method comprising the administration or feeding of the nutritional formulas of the present invention to the infant, child, or adult.

The present invention is also directed to a method of improving the oxidative stability of a powder nutritional formula, said method comprising preparing the nutritional formulas described herein comprising the selected blends of lutein, lycopene, and beta-carotene.

It has been found that the nutritional formulas of the present invention have improved stability against oxidative processes. As shown by the in vitro data set forth herein, it was found that the combination of lutein, lycopene, and beta-carotene in a powder nutritional formula provides as much antioxidant stability as a similar formula containing about six times as much carotenoid antioxidant (beta-carotene). It was also found that by using the reduced concentration of carotenoids made possible by the antioxidant blend described herein, that the carotenoid concentration also resulted in reduced off-colors commonly associated with the use of carotenoids such a beta-carotene, lycopene, and so forth. More specifically, it was found that nutritional formulas containing less than about 11 ppm of the carotenoid blend as described herein, in the relative weight ratios as also described herein, provide for a significantly whiter color than other carotenoid-containing nutritional formulas as measured by conventional Hunter and Agtron color readings.

DETAILED DESCRIPTION OF THE INVENTION

Figure 1:
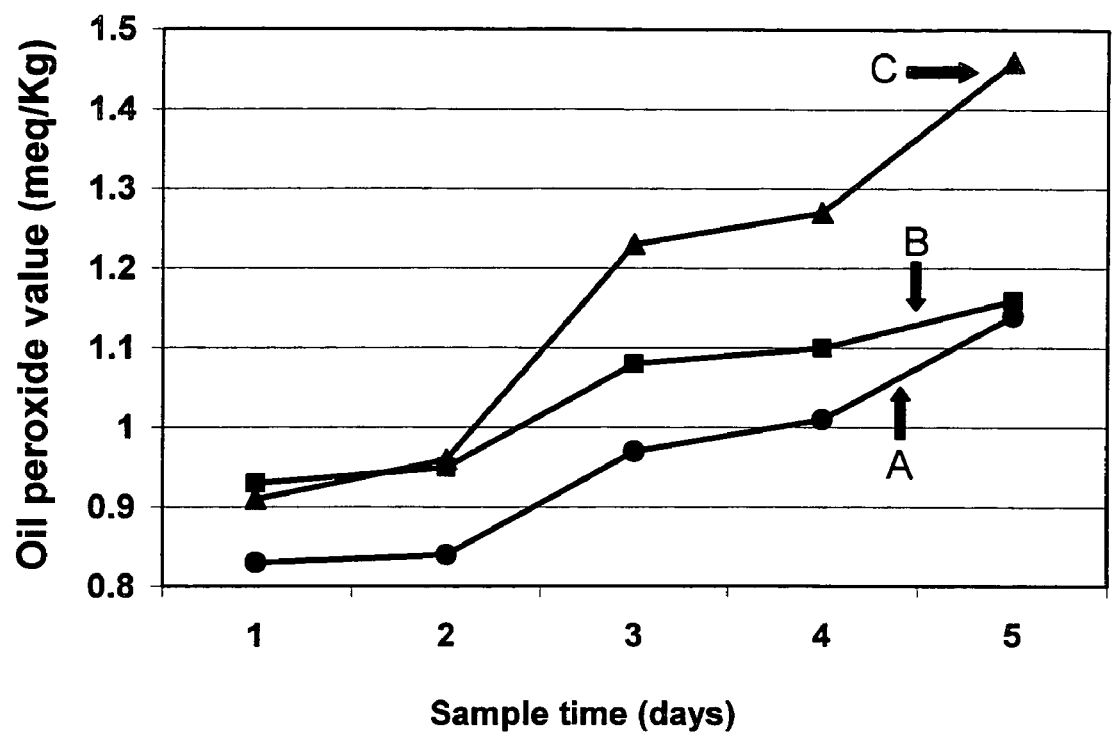
FIG. 1 is a graph illustrating oxidative stability data from an oil blend peroxide experiment described herein. Line "A" represents the oil sample containing 12 ppm beta-carotene, line "B" represents the oil sample containing 2.11 ppm of a carotenoid blend comprising lutein, beta-carotene, and lycopene, and line "C" represents the oil sample containing just 2.11 ppm beta-carotene.

The nutritional formulas of the present invention, including those in powder form, comprise protein, carbohydrate, and a lipid containing polyunsaturated fatty acid, and select combinations of antioxidant carotenoids including lutein, lycopene, and beta-carotene. These and other essential elements or limitations of the nutritional formulas and corresponding methods of the present invention are described in detail hereinafter.

The term "lipid" as used herein, unless otherwise specified, means any element of the nutritional formula soluble in an organic solvent, including fats, oils, and combinations thereof.

The term "total oil content" as used herein, unless otherwise specified, refers to the lipid component of the nutritional formula of the present invention.

The term "infant" as used herein refers to children not more than about one year of age, and includes infants from 0 to about 4 months of age, infants from about 4 to about 8 months of age, infants from about 8 to about 12 months of age, low birth weight infants at less than 2,500 grams at birth, and premature infants born at less than about 37 weeks gestational age, typically from about 26 weeks to about 34 weeks gestational age. The term "child" and "children" as used herein refers to children not more than 12 years of age, and includes children from about 12 months to about 12 years of age. The term "adult" as used herein refers to adults and children about 12 years and older.

The term "nutritional formula" as used herein refers to a nutritional composition designed for infants, toddlers, children, adults, or combinations thereof, which preferably contains sufficient protein, carbohydrate, lipid, vitamins, minerals, and electrolytes to potentially serve as the sole source of nutrition when provided in sufficient quantity.

The terms "polyunsaturated fatty acid" or "PUFA" as used herein, unless otherwise specified, refer to any polyunsaturated fatty acid or source thereof, including short chain (less than about 6 carbon atoms per chain), medium chain (from about 6 to 18 carbon atoms per chain) and long chain (having at least about 20 carbon atoms per chain) fatty acids having two or more carbon:carbon double bonds, including ω-3 and ω-6 polyunsaturated fatty acids.

The term "total formula solids" as used herein, unless otherwise specified, refers to the sum concentration or total amount of all ingredients in the nutritional formula, less water.

All percentages, parts and ratios as used herein are by weight of the total composition, unless otherwise specified. All such weights as they pertain to listed ingredients are based on the active level and, therefore, do not include solvents or by-products that may be included in commercially available materials, unless otherwise specified.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, 5, 6, from 1 to 9, from 3.6 to 4.6, from 3.5 to 9.9, and so forth.

All references to singular characteristics or limitations of the present invention shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The nutritional formulas and corresponding methods of the present invention can comprise, consist of, or consist essentially of the essential elements and limitations of the invention described herein, as well as any additional or optional ingredients, components, or limitations described herein or otherwise useful in nutritional formula applications.

Carotenoids

The nutritional formulas of the present invention comprise select combinations of the carotenoids lutein, lycopene, and beta-carotene. These combinations as selected and defined herein provide a formula with improved antioxidant stability as well as improved color performance from a carotenoid-containing nutritional formula.

The nutritional formulas of the present invention comprise select combinations of lutein, lycopene, and beta-carotene, such that the combinations represent by weight of the total oil content of the formula less than about 11 ppm, preferably less than about 9 ppm, including from about 0.25 to 8 ppm, and also including from about 0.5 to about 5 ppm, and also including from about 1 to about 3 ppm.

Individually, it is preferable that lutein represents up to about 5.16 ppm, including from about 0.1 to about 4.5 ppm, and also including from about 0.5 to about 2.5 ppm by weight of the total oil content of the formula. It is also preferable that lycopene represents up to about 9.8 ppm, including from about 0.0475 to about 8 ppm, and also including from about 0.2 to about 5 ppm by weight of the total oil content of the formula. It is also preferable that beta-carotene represents up to about 5.9 ppm, including from about 0.087 to about 5.0 ppm, and also including from about 0.1 to about 4 ppm by weight of the total oil content of the formula.

The selected carotenoid combination is preferably further characterized, in addition to the absolute amounts described above, by relative weight ratios of lutein to beta-carotene of from about 0.0196:1 to about 59:1, including from about 0.05:1 to about 50:1, including from about 0.1:1 to about 40:1, and also including from about 0.1:1 to about 10:1; and weight ratios of lycopene to beta-carotene of from about 0.00805:1 to about 114:1, including from about 0.01:1 to about 95:1, including from about 0.1:1 to about 60:1, and also including from about 0.1:1 to about 10:1; and weight ratios of lutein to lycopene of from about 0.0117:1 to about 108:1, including from about 0.05:1 to about 95:1, including from about 0.1:1 to about 70:1, and also including from about 0.1:1 to about 10:1.

Each of the carotenoids in the selected combinations can be obtained from any known or otherwise suitable material source for use in nutritional formulas, and each can be provided individually, or all together, or in any combination and from any number of sources, including sources such as multivitamin premixes containing other vitamins or minerals in combination with one or more of the essential carotenoids as described herein. Non-limiting examples of some suitable sources of lutein, lycopene, beta-carotene, or combinations thereof in the composition include LycoVit® synthetic lycopene dispersion in vegetable oil provided by BASF, Mount Olive, N.J., USA, Lyc-O-Mato® tomato extract in oil, powder, or bead form provided by LycoRed Natural Products Industries, Ltd., Bear Sheba, Israel, water-dispersible and oil soluble lycopene provided by DSM Nutritional Products, Basel, Switzerland, FloraGLO® brand free lutein provided by Kemin Foods, Des Moines, Iowa, Xangold® Lutein Esters provided by Cognis, Cincinnati, Ohio, U.S.A., and beta-carotene provided by BASF, Mount Olive, N.J.

Polyunsaturated Fatty Acids

The nutritional formulas of the present invention comprise one or more polyunsaturated fatty acids or sources thereof, examples of which include any known or otherwise suitable polyunsaturated fatty acid or source thereof for use in nutritional formulas.

The concentration of polyunsaturated fatty acids in the formulas of the present invention includes any concentration or amount which is safe for use. Such concentrations generally range up to about 20%, including from about 0.01% to about 18%, including from 0.1% to about 12%, also including from about 0.2% to about 10%, and also including from about 0.5% to about 7%, polyunsaturated fatty acid by weight of the total formula solids.

Non-limiting examples of some suitable polyunsaturated fatty acids for use in the nutritional formulas of the present invention include arachidonic acid, docosahexaenoic acid, linoleic acid, linolenic acid, eicosapentaenoic acid, and combinations thereof. Preferred are those nutritional formulas that contain at least arachidonic acid, docosahexaenoic acid, or eicosapentaenoic acid, or combinations thereof. Non-limiting sources of arachidonic acid, eicosapentaenoic acid, and/or docosahexaenoic acid include marine oil, egg derived oils, fungal oil, algal oil, other single cell oils, and combinations thereof.

The polyunsaturated fatty acid may be formulated into the nutritional formula as the free fatty acid or as compounds or materials that can otherwise provide a source of such free fatty acids upon or following administration to the person, including phospholipids and glyceride esters (mono-, di-, tri-) of polyunsaturated fatty acids. Polyunsaturated fatty acids and sources thereof are described in U.S. Pat. No. 6,080,787 (Carlson, et al.) and U.S. Pat. No. 6,495,599 (Auestad, et al.), which descriptions are incorporated by reference herein.

The infant nutritional formula embodiments of the present invention preferably comprise one or more of arachidonic acid, docosahexaenoic acid, or combinations thereof, alone or in further combination with linoleic acid and/or linolenic acid. Arachidonic acid concentrations preferably range up to about 2.0%, more preferably from about 0.2% to about 1.0%, even more preferably from about 0.35% to about 0.9%, and most preferably from about 0.4% to about 0.5%, by weight of the total fatty acids in the formula. Docosahexaenoic acid concentrations preferably range up to about 1.0%, more preferably from about 0.1% to about 1.0%, and even more preferably from about 0.13% to about 0.36%, by weight of the total fatty acids in the formula. Linoleic concentrations preferably range up to about 30%, more preferably from about 10% to about 30%, and even more preferably from about 15% to about 25%, by weight of the total fatty acids in the formula. Linolenic acid concentrations preferably range up to about 4%, more preferably from about 1.5% to about 4%, even more preferably from about 2% to about 3%, and even more preferably from about 2.2% to about 2.6%. These preferred fatty acids are described in U.S. Pat. No. 6,495,599 (Auestad et al.), which description is incorporated herein by reference.

Nutrients

The nutritional formulas of the present invention may comprise sufficient types and amounts of nutrients to meet the targeted dietary needs of the intended user. These formulas may therefore comprise protein, carbohydrate, and a lipid component in addition to the polyunsaturated fatty acid component also described herein. The formulas may further comprise vitamins, minerals or other ingredients suitable for use in nutritional formula.

For example, when the composition is an adult formula, the protein component may comprise from about 10% to about 80% of the total caloric content of said nutritional formula; the carbohydrate component may comprise from about 10% to about 70% of the total caloric content of said nutritional formula; and the lipid component may comprise from about 5% to about 50% of the total caloric content of said nutritional formula. The nutritional formula may be in liquid or powder form. These ranges are provided as examples only, and are not intended to be limiting.

When the composition is a non-adult formula, the non-adult formula includes those embodiments in which the protein component may comprise from about 7.5% to about 25% of the total caloric content of the nutritional formula; the carbohydrate component may comprise from about 35% to about 50% of the total caloric content of the nutritional formula; and the lipid component may comprise from about 30% to about 60% of the total caloric content of the nutritional formula. These ranges are provided as examples only, and are not intended to be limiting.

Many different sources and types of carbohydrates, lipids, proteins, minerals and vitamins are known and can be used in the nutritional formulas of the present invention, provided that such nutrients are compatible with the added ingredients in the selected formula, are safe for their intended use, and do not otherwise unduly impair product performance.

Carbohydrates suitable for use in the nutritional formulas of the present invention can be simple or complex, lactose-containing or lactose-free, or combinations thereof, non-limiting examples of which include hydrolyzed, intact, naturally and/or chemically modified cornstarch, maltodextrin, glucose polymers, sucrose, corn syrup, corn syrup solids, rice or potato derived carbohydrate, glucose, fructose, lactose, high fructose corn syrup and indigestible oligosaccharides such as fructooligosaccharides (FOS), and combinations thereof.

Non-limiting examples of proteins suitable for use in the nutritional formulas include hydrolyzed, partially hydrolyzed or non-hydrolyzed proteins or protein sources, and can be derived from any known or otherwise suitable source such as milk (e.g., casein, whey), animal (e.g., meat, fish), cereal (e.g., rice, corn), vegetable (e.g., soy), or combinations thereof. The proteins for use herein can also include, or be entirely or partially replaced by, free amino acids known for use in nutritional products, non-limiting examples of which include tryptophan, glutamine, tyrosine, methionine, cysteine, arginine, and combinations thereof. Other (non-protein) amino acids typically added to nutritional products include carnitine and taurine. In some cases, the D-forms of the amino acids are considered as nutritionally equivalent to the L-forms, and isomer mixtures are used to lower cost (for example, D,L-methionine).

Non-limiting examples of lipids suitable for use in the nutritional formulas include coconut oil, soy oil, corn oil, olive oil, safflower oil, high oleic safflower oil, MCT oil (medium chain triglycerides), sunflower oil, high oleic sunflower oil, palm and palm kernel oils, palm olein, canola oil, marine oils, cottonseed oils, and combinations thereof.

In addition to these food grade oils, structured lipids may be incorporated into the nutritional if desired. Structured lipids are known in the art, descriptions of which can be found in INFORM, Vol. 8, no. 10, page 1004, *Structured lipids allow fat tailoring* (October 1997); and U.S. Pat. No. 4,871,768, the latter description of which is incorporated herein by reference. Structured lipids are predominantly triacylglycerols containing mixtures of medium and long chain fatty acids on the same glycerol nucleus. Structured lipids are also described in U.S. Pat. Nos. 6,194,37 and 6,160,007, which descriptions are also incorporated by reference herein.

The nutritional formulas of the present invention may further comprise any of a variety of vitamins in addition to the carotenoids described hereinbefore, non-limiting examples of which include vitamin A, vitamin D, vitamin E, vitamin K, thiamine, riboflavin, pyridoxine, vitamin B12, niacin, folic acid, pantothenic acid, biotin, vitamin C, choline, chromium, carnitine, inositol, salts and derivatives thereof, and combinations thereof.

The nutritional formulas may further comprise any of a variety of minerals, non-limiting examples of which include calcium, phosphorus, magnesium, iron, zinc, manganese, copper, iodine, sodium, potassium, chloride, and combinations thereof.

The infant formula embodiments of the present invention preferably comprise nutrients in accordance with the relevant infant formula guidelines for the targeted consumer or user population, an example of which would be the Infant Formula Act, 21 U.S.C. Section 350(a).

The nutritional formulas of the present invention include those embodiments containing the carbohydrate, lipid, and protein concentrations described below in Table 1.

TABLE 1

Nutritional Formula Macro Nutrients*

| Nutrient | Embodiment | g/100 kcal | g/100 g total solids | g/L (as fed) |
|---|---|---|---|---|
| Carbohydrate | 1st embodiment | 8–16 | 30–90 | 54–108 |
| | 2nd embodiment | 9–13 | 45–60 | 57–79 |
| | 3rd embodiment | 15–19 | 63–81 | 157–203 |
| Lipid | 1st embodiment | 3–8 | 15–42 | 20–54 |
| | 2nd embodiment | 4–6.6 | 20–30 | 27–45 |
| | 3rd embodiment | 2–5 | 8–21 | 20–53 |
| Protein | 1st embodiment | 1–3.9 | 8–20.5 | 7–24 |
| | 2nd embodiment | 1.5–3.4 | 10–17 | 10–23 |
| | 3rd embodiment | 3.5–6.0 | 14.8–25.3 | 37–63 |

*all numerical values preceded by the term "about"

The nutritional formulas of the present invention include those embodiments that comprise per 100 kcal of formula one or more of the following: vitamin A (from about 250 to about 750 IU), vitamin D (from about 40 to about 100 IU), vitamin K (greater than about 4 m), vitamin E (at least about 0.3 IU), vitamin C (at least about 8 mg), thiamine (at least about 8 g), vitamin B12 (at least about 0.15 g), niacin (at least about 250 g), folic acid (at least about 4 g), pantothenic acid (at least about 300 g), biotin (at least about 1.5 g), choline (at least about 7 mg), and inositol (at least about 4 mg).

The nutritional formulas of the present invention include those embodiments that comprise per 100 kcal of formula one or more of the following: calcium (at least about 50 mg), phosphorus (at least about 25 mg), magnesium (at least about 6 mg), iron (at least about 0.15 mg), iodine (at least about 5 g), zinc (at least about 0.5 mg), copper (at least about 60 g), manganese (at least about 5 g), sodium (from about 20 to about 60 mg), potassium (from about 80 to about 200 mg), and chloride (from about 55 to about 150 mg).

Optional Ingredients

The nutritional formulas of the present invention may further comprise other optional components that may modify the physical, chemical, aesthetic or processing characteristics of the compositions or serve as pharmaceutical or additional nutritional components when used in the targeted population. Many such optional ingredients are known or otherwise suitable for use in food and nutritional products, including infant formulas, and may also be used in the nutritional formulas of the present invention, provided that such optional materials are compatible with the essential materials described herein, are safe for their intended use, and do not otherwise unduly impair product performance.

Non-limiting examples of such optional ingredients include preservatives, additional anti-oxidants, emulsifying agents, buffers, colorants, flavors, nucleotides and nucleosides, probiotics, prebiotics, lactoferrin and related derivatives, thickening agents and stabilizers, and so forth.

Method of Use

The present invention is also directed to a method of providing an infant, toddler, child, or adult with their sole, primary, or supplemental nutrition needs. The method comprises feeding or otherwise administering to such a person the nutritional formulas of the present invention.

The present invention is also directed to a method of providing improved antioxidant stability, especially in a powder embodiment, by formulating or preparing the nutritional formulas of the present invention, with the selection and combination of carotenoids lutein, lycopene, and beta-carotene, as described herein.

The present invention is also directed to a method of providing a nutritional formula, especially a powder nutritional formula, with antioxidant stability and a whiter or less red-orange appearing formula. In this context, the color improvement in the nutritional formula can be identified in accordance with standard Hunter color readings, such as those described hereinafter.

For powder embodiments of the present invention, the above-described methods of use further comprise reconstitution of the powder with a suitable aqueous liquid, preferably water, followed by oral or enteral administration of the resulting nutritional liquid to provide the person with their sole, primary, or supplemental nutrition. Such dilution may be in an amount sufficient to provide a caloric density appropriate for the patient population to which the formula is directed. Caloric densities are described hereinafter in greater detail.

Product Form

The nutritional formulas of the present invention may be prepared as any product form suitable for use in humans, including reconstitutable powders, ready-to-feed liquids, and dilutable liquid concentrates, which product forms are all well known in the nutritional formula art.

The nutritional formulas of the present invention may have any caloric density suitable for the targeted or intended patient population, or provide such a density upon reconstitution of a powder embodiment or upon dilution of a liquid concentrate embodiment. Most common caloric densities for the infant formulas embodiments of the present invention are generally at least about 19 kcal/fl oz (660 kcal/liter), more typically from about 20 kcal/fl oz (675–680 kcaluliter) to about 25 kcal/fl oz (820 kcal/liter), even more typically from about 20 kcal/fl oz (675–680 kca/liter) to about 24 kcal/fl oz (800–810 kcal/liter). Generally, the 22–24 kcal/fl oz formulas are more commonly used in pre-term of low birth weight infants, and the 20–21 kcal/fl oz (675–680 to 700 kcau/liter) formulas are more often used in term infants. Non-infant and adult nutritional formulas may have any caloric density suitable for the targeted or intended population.

For powder embodiments of the present invention, such powders are typically in the form of flowable or substantially flowable particulate compositions, or at least particulate compositions that can be easily scooped and measured with a spoon or similar other device, wherein the compositions can easily be reconstituted by the intended user with a suitable aqueous fluid, typically water, to form a liquid nutritional formula for immediate oral or enteral use. In this context, "immediate" use generally means within about 48 hours, most typically within about 24 hours, preferably right after reconstitution. These powder embodiments include spray dried, agglomerated, dry mixed or other known or otherwise effective particulate form. The quantity of a nutritional powder required to produce a volume suitable for one serving can vary.

The nutritional formulas of the present invention may be packaged and sealed in single or multi-use containers, and then stored under ambient conditions for up to about 36 months or longer, more typically from about 12 to about 24 months. For multi-use containers, these packages can be opened and then covered for repeated use by the ultimate user, provided that the covered package is then stored under ambient conditions (e.g., avoid extreme temperatures) and the contents used within about one month or so.

Method of Manufacture

The nutritional formulas of the present invention may be prepared by any known or otherwise effective technique suitable for making and formulating a nutritional formula or similar other formula, variations of which may depend upon variables such as the selected product form, ingredient combination, packaging and container selection, and so forth, for the desired nutritional formula. Such techniques and variations for any given formula are easily determined and applied by one of ordinary skill in the nutritional formulation or manufacturing arts.

The nutritional formulas of the present invention, including the exemplified formulas described hereinafter, can therefore be prepared by any of a variety of known or otherwise effective formulation or manufacturing methods. These methods most typically involve the initial formation of an aqueous slurry containing carbohydrates, proteins, lipids, stabilizers or other formulation aids, vitamins, minerals, or combinations thereof. The slurry is emulsified, pasteurized, homogenized, and cooled. Various other solutions, mixtures, or other materials may be added to the resulting emulsion before, during, or after further processing. This emulsion can then be further diluted, heat-treated, and packaged to form a ready-to-feed or concentrated liquid, or it can be heat-treated and subsequently processed and packaged as a reconstitutable powder, e.g., spray dried, dry mixed, agglomerated.

Other suitable methods for making nutritional formulas are described, for example, in U.S. Pat. No. 6,365,218 (Borschel, et al.), U.S. Pat. No. 6,589,576 (Borschel, et al.), U.S. Pat. No. 6,306,908 (Carlson, et al.), U.S. Patent Application 20030118703 A1 (Nguyen, et al.), which descriptions are incorporated herein by reference.

EXAMPLES

The following examples further describe and demonstrate specific embodiments within the scope of the present invention. The examples are given solely for the purpose of illustration and are not to be construed as limitations of the present invention, as many variations thereof are possible without departing from the spirit and scope of the invention. All exemplified amounts are weight percentages based upon the total weight of the composition, unless otherwise specified.

Each of the exemplified formulas is fed to humans to provide daily nutrition. Each composition contains the lutein, lycopene, and beta-carotene components as described herein, wherein each composition is oxidatively stable and has a whiter, less-red/orange color prior to use as determined by conventional color or light readings.

Example 1

This example illustrates a liquid infant formula embodiment of the present invention, including a method of using and making the formula. The formula ingredients for each batch are listed in the following table.

Example 1

Liquid Infant Formula, Ingredients

| Ingredient | Quantity per 454 kg |
| --- | --- |
| Water | QS |
| Lactose | 27 kg |
| ARA-containing oil (40% ARA) | 0.167 kg |
| DHA-containing oil (40% DHA) | 0.063 kg |
| Non-fat dry milk | 11.33 kg |
| High oleic safflower oil | 6.5 kg |
| Mono- and di-glycerides | 0.162 kg |
| Soybean oil | 5 kg |
| Whey protein | 2.8 kg |
| Calcium carbonate | 0.211 kg |
| Coconut oil | 4.6 kg |
| Citric acid | 0.014 kg |
| Potassium citrate | 0.245 kg |
| Ascorbic acid | 178 g |
| Lecithin | 162 g |
| Magnesium chloride | 25 g |
| Potassium chloride | 88 g |
| Ferrous sulfate | 26 g |
| Carrageenan | 136 g |
| Choline chloride | 25 g |
| Nucleotide and choline premix 3 | 133 g |
| Riboflavin | 1 g |
| L-Carnitine | 1.5 g |
| Potassium hydroxide | 998 g |
| Lutein solution (5% active) | 0.388 g |

-continued

| | |
| --- | --- |
| Water soluble vitamin premix 1 | 65 g |
| Vitamin ADEK premix 2 | 21 g |
| Vitamin A | 0.4 g |
| Beta-carotene solution (30% active) | 0.0485 g |
| Carotenoid content from all ingredients, ppm by weight of total lipids | |
| Beta-carotene | 0.87 ppm |
| Lutein | 1.2 ppm |
| Lycopene | 0.48 ppm |

1 premix contains (per 65 g) 19.8 g taurine, 14.4 g inositol, 6.7 g zinc sulfate, 4.2 g niacinamide, 2.6 g calcium pantothenate, 2.3 g ferrous sulfate, 0.8 g cupric sulfate, 0.6 g thiamine, 0.3 g riboflavin, 0.26 g pyridoxine, 0.1 g folic acid, 0.07 g manganese sulfate, 0.03 g biotin, 0.025 g sodium selenate, 0.002 g cyanocobalamin
2 premix contains (per 21 g) 4.0 g alpha-tocopherol acetate, 0.8 g vitamin A palmitate, 0.05 g phylloquinone, 0.006 g vitamin D3
3 premix contains (per 133 g): 23 g choline bitartrate, 15 g 5'-CMP, 11 g 5'-GMP, 10 g 5'-UMP, 6 g 5'-AMP The exemplified liquid formula is generally prepared by making at least three separate slurries that are later blended together, heat treated, standardized, packaged and sterilized. Initially, a carbohydrate-mineral slurry is prepared by dissolving lactose in water at 65–71° C., followed by the addition of magnesium chloride, potassium citrate, potassium chloride, choline chloride, and citric acid. The resulting slurry is held with agitation at 55–65° C. for not longer than eight hours until it is later blended with the other prepared slurries.

A protein-fat slurry is prepared by combining high oleic safflower oil, soy oil, and coconut oil at 55–60° C., followed by the addition of vitamin ADEK premix, mono- and diglycerides, lecithin, carrageenan, vitamin A, ARA oil, and DHA oil. Whey protein and calcium carbonate are then added. The resulting protein-oil slurry is held under moderate agitation at 40–43° C. for no longer than two hours until it is later blended with the other formed slurries.

The carbohydrate-mineral slurry is then combined with water and non-fat dry milk and allowed to agitate for 10 minutes. The protein-oil slurry is then added and the resulting mixture agitated for at least 10 minutes. Lutein, lycopene, and beta-carotene are then added to the blend and agitated for at least 15 minutes. The pH of the resulting blend is adjusted to 6.68–6.75 with 1N potassium hydroxide.

After waiting for a period of not less than one minute nor greater than two hours, the resulting blend is heated to 71–82° C. and dearated under vacuum, emulsified through a single stage homogenizer at 900–1100 psig, and then heated to 99–110° C., and then heated again to 146° C. for about 5 seconds. The heated blend is passed through a flash cooler to reduce the temperature to 99–110° C. and then through a plate cooler to further reduce the temperature to 71–76° C. The cooled blend is then homogenized at 3900–4100/400–600 psig, and then held at 74–80° C. for 16 seconds, and then cooled to 1–7° C. Samples are taken for microbiological and analytical testing. The mixture is held under agitation.

A water-soluble vitamin (WSV) solution and an ascorbic acid solution are prepared separately and added to the processed blended slurry. The vitamin solution is prepared by adding the following ingredients to 9.4 kg of water with agitation: potassium citrate, ferrous sulfate, WSV premix, L-carnitine, riboflavin, and the nucleotide-choline premix. The ascorbic acid solution is prepared by adding potassium citrate and ascorbic acid to a sufficient amount of water to dissolve the ingredients. The vitamin and ascorbic acid solutions are then added to the blend, and the pH of the blend adjusted to 7–10 with 45% potassium hydroxide solution.

Based on the analytical results of the quality control tests, an appropriate amount of water is added to the batch with agitation to achieve the desired total solids. The product pH may be adjusted to achieve optimal product stability. The completed product is then placed in suitable containers and subjected to terminal sterilization.

Example 2

This example illustrates a powder embodiment of the present invention, including a method of using and making the formula. The formula ingredients for each batch are listed in the following table.

Example 2

Powder Soy Formula, Ingredients

| INGREDIENT | Quantity per 454 kg |
|---|---|
| High oleic safflower oil | 52.1 kg |
| Coconut oil | 35.2 kg |
| Soy oil | 38.1 kg |
| ARA-containing oil (40% ARA) | 1.3 kg |
| DHA-containing oil (40% DHA) | 0.381 kg |
| Oil soluble vitamin premix | 0.173 kg |
| β-carotene solution (30% active) | 0.0004 kg |
| Ascorbyl palmitate | 0.162 kg |
| Soy protein isolate | 66.1 kg |
| Corn syrup | 236.0 kg |
| Calcium phosphate (di and tribasic) | 8.0 kg |
| Ferrous sulfate | 0.138 kg |
| Lutein solution (5.0% active) | 0.003 kg |
| Water soluble vitamin premix trace minerals/taurine | 0.65 kg |
| Choline chloride | 0.23 kg |
| Potassium iodide | 0.0005 kg |
| Methionine | 0.722 kg |
| Lycopene solution (20% active) | 0.0003 kg |
| Ascorbic acid | 0.72 kg |
| Potassium hydroxide (45% solution) | 1.2 kg |
| Potassium chloride | 0.87 kg |
| Carnitine | 0.05 kg |
| Carotenoid content from all ingredients, ppm by weight of total lipids | |
| Beta-carotene | 0.9 ppm |
| Lutein | 1.2 ppm |
| Lycopene | 0.5 ppm |

The first step in the preparation of the exemplified powder is the preparation of the oil blend. Soy oil, coconut oil and high oleic safflower oil are combined in a suitable container or tank at 60–65° C. with agitation. Ascorbyl palmitate and mixed tocopherols are added to the tank, followed by the oil soluble vitamin premix, all with agitation. -carotene (BASF, Mount Olive, N.J.), lycopene (BASF, Mount Olive, N.J.), and lutein (Kemin, Des Moines, Iowa) are added to the oil blend and agitated until well dispersed. Soy protein isolate and methionine are then added to the oil blend, and the resulting mixture agitated and held at 54.0–60° C. until used later during the manufacturing process.

The carbohydrate-mineral slurry is then prepared. Potassium chloride, sodium chloride, magnesium chloride, and potassium iodide are added to water 60–65° C., followed by di- and tri-calcium phosphates, all with agitation. Sucrose is then added with agitation, and the slurry held at 54–60° C. until used later during the manufacturing process.

The carbohydrate-mineral slurry is added to the oil blend. Additional water is added as necessary. The ARA and DHA containing oils are added to the blend. The pH of the resulting mixture is adjusted to 6.75–6.85 using KOH solution. The adjusted mixture is then held at 54–60C under agitation for at least 15 minutes.

The resulting mixture is then heated to 74–79C and dearated under vacuum, emulsified through a single stage homogenizer at 0–2.76 Mpa, passed through a two-stage homogenizer at 6.2–7.6 MPa and 2.1–3.4 MPa. The homogenized mixture is held at 73–79C for 16 seconds and then cooled to 1–7C. Samples are taken for microbiological and analytical testing. The mixture is held under agitation.

A calcium carbonate solution may be prepared for use in adjusting the calcium level of the mixture if outside of specification.

A vitamin stock solution is prepared. Potassium citrate and ferrous sulfate are added to water at 37–66C The vitamin premix is then added and the mixture agitated. The choline chloride is added and then the required amount of this vitamin mixture is added to the batch.

An ascorbic acid solution is prepared and added slowly to the batch with agitation for at least 10 minutes. The batch is then preheated to 74–79° C. The batch is then held for 5 seconds at 107–111° C. using direct steam injection. The batch is then cooled to 71–82° C. before being pumped to a spray dryer and dried to a flowable powder. The batch is then packaged in suitable containers and sealed under a headspace of less than 2.0% oxygen.

Example 3

This example illustrates a milk protein-based powder embodiment of the present invention, including a method of using and making the formula. The formula ingredients for each batch are listed in the following table.

Example 3

Powder Milk-Based Infant Formula, Ingredients

| Ingredient Name | Quantity per 454 kg |
|---|---|
| Soy oil | 35.8 kg |
| Coconut oil | 23.8 kg |
| MCT oil | 32.1 kg |
| High Oleic Safflower oil | 34.6 kg |
| Ascorbyl palmitate | 0.157 kg |
| Vitamin A palmitate | 0.002 kg |
| Vitamin ADEK premix 1 | 0.192 kg |
| Mixed tocopherols | 0.075 kg |
| Lutein solution (20% active) | 0.000939 kg |
| Lycopene solution (20% active) | 0.000704 kg |
| Beta-carotene solution (30% active) | 0.000574 kg |
| Whey protein concentrate | 32.7 kg |
| Calcium carbonate | 1.2 kg |
| Lactose | 54.5 kg |
| Corn syrup solids | 117.1 kg |
| Magnesium chloride | 0.724 kg |
| Potassium citrate | 2.8 kg |

-continued

| | |
|---|---|
| Sodium chloride | 0.39 kg |
| Sodium citrate | 0.001 kg |
| Non-fat dried milk | 116.9 kg |
| Calcium phosphate tribasic | 1.8 kg |
| ARA-containing oil (40% ARA) | 1.3 kg |
| DHA-containing oil (40% DHA) | 0.49 kg |
| Ascorbic acid | 1.29 kg |
| Potassium hydroxide 1N solution | 9.8 kg |
| Ferrous sulfate | 0.168 kg |
| Carnitine | 0.136 kg |
| Choline chloride | 0.182 kg |
| Vitamin and trace mineral premix 2 | 0.825 kg |
| Inositol | 0.734 kg |
| Nucleotide and choline bitartrate premix 3 | 1.1 kg |
| Carotenoid content from all ingredients, ppm by weight of total lipids | |
| Beta-carotene | 1.45 ppm |
| Lutein | 1.6 ppm |
| Lycopene | 1.2 ppm |

1 premix provides 71 gm d-alpha-tocopheryl acetate, 7.29 gm Vitamin A palmitate, 0.422 gm phylloquinone, and 0.051 gm Vitamin D3 to the product.
2 premix provides 252 gm taurine, 183 gm inositol, 84.5 gm zinc sulfate, 53.8 gm niacinamide, 32.6 gm calcium pantothenate, 29 gm ferrous sulfate, 10.1 gm cupric sulfate, 8.4 gm thiamine, 3.7 gm riboflavin, 3.4 gm pyridoxine (HCl), 1.1 gm folic acid, 1.0 gm manganese sulfate, 0.3 gm biotin, 0.2 gm sodium selenate, and 0.03 gm cyanocobalamin to the product.
3 premix provides 188 gm choline bitartrate, 118 gm cytidine 5'-monophosphate, 92 gm disodium guanosine 5'-monophosphate, 80 gm disodium uridine 5'-monophosphate, and 51 gm adenosine 5'-monophosphate to the product.

This powder formula is manufactured by preparing at least two slurries that are later blended together, heat treated, standardized, spray dried and packaged. Initially, a carbohydrate-mineral slurry is prepared (45–50% solids) by dissolving lactose in water at 66–76° C. Corn syrup solids are then added and allowed to dissolve, followed by the addition of magnesium chloride, potassium citrate, sodium chloride, choline chloride, and sodium citrate, all with agitation. The resulting carbohydrate-mineral slurry is held at 54–60° C. under agitation until used later during the manufacturing process.

A protein-fat slurry is prepared by combining high oleic safflower oil, coconut oil, soy oil, and MCT oil at 40.5–49° C., followed by ascorbyl palmitate, mixed tocopherols, vitamin A palmitate, and the vitamin ADEK premix, all with agitation. Lutein (Kemin, Des Moines, Iowa), lycopene (Roche, Belvidere, N.J.), and beta-carotene (BASF, Mount Olive, N.J.) are then added with agitation. Whey protein concentrate is then added to the slurry, followed by calcium carbonate, all with agitation. The completed protein-fat slurry is held under moderate agitation at 54–60° C. for no longer than twelve hours until it is blended with the other prepared slurries.

The carbohydrate-mineral slurry is transferred to a tank in which a sufficient amount of water is added to create a final blend slurry of approximately 50% solids. Non-fat dry milk is then added to the blend and allowed to solubilize. The protein-fat slurry is then added and the entire blend slurry is allowed to agitate for at least 15 minutes. The resulting blend is maintained at 60–65° C. The blend pH is adjusted to 6.7–6.9 with 1N KOH.

After waiting for a period of not less than one minute nor greater than two hours, the resulting blend is heated to 71–79° C., emulsified at 2.75–4.1 Mpa, and then heated to 115–127° C. for about 5 seconds using direct steam injection. The heated emulsion is then flash cooled to 87–99° C., and homogenized at 9.7–11.0/2.75–4.1 MPa. The homogenized slurry is then cooled to 1.6–7.2° C. Samples are taken for microbiological and analytical testing. The mixture is held under agitation.

A vitamin-trace mineral solution is prepared by adding the following ingredients to the required amount of water, under agitation: potassium citrate, ferrous sulfate, carnitine, vitamin and the trace mineral premix, inositol, and nucleotide and choline bitartrate premix. The vitamin-trace mineral solution is then added to the homogenized slurry under agitation.

An ascorbic acid solution is prepared by adding potassium citrate and ascorbic acid to water with agitation, and then adding the aqueous mixture to the homogenized slurry under agitation.

The product is preheated to 65.5–77° C. The product is then held at 82–90.5° C. for 5 seconds before being flash cooled to 71–82° C. and pumped to the spray dryer. The product is spray dried to produce a desired free-flowing powder. The resulting powder is packaged under nitrogen to maximize product stability and flavor.

Example 4

This example illustrates a flavored liquid embodiment of the present invention, including a method of using and making the formula. The formula ingredients for a 1000 kg batch are listed in the following table.

Example 4

Liquid Nutritional Formula, Ingredients

| Ingredient | Quantity per 1,000 kg |
|---|---|
| Water | QS |
| Corn syrup | 33 kg |
| Maltodextrin | 28 kg |
| Sucrose | 19.4 kg |
| Caseinate | 8.7 kg |
| High oleic safflower oil | 4.1 kg |
| Canola oil | 4.1 kg |
| Soy protein | 3.7 kg |
| Whey protein | 3.2 kg |
| Caseinate | 2.9 kg |
| Corn oil | 2.0 kg |
| Tricalcium phosphate | 1.4 kg |
| Potassium citrate | 1.3 kg |
| Magnesium phosphate | 952 g |
| Lecithin | 658 g |
| Magnesium chloride | 558 g |
| Vanilla Flavor | 544 g |
| Sodium Chloride | 272 g |
| Carrageenan | 227 g |
| Choline chloride | 218 g |
| UTM/TM premix 3 | 165 g |
| Potassium chloride | 146 g |
| Ascorbic acid | 145 g |
| Sodium Citrate | 119 g |
| Potassium hydroxide | 104 g |
| Lutein solution (5% active) | 10 g |
| Water soluble vitamin premix 1 | 33 g |
| Vit DEK premix 2 | 29 g |
| Vitamin A | 3.7 g |
| Potassium iodide | 86 mcg |
| Beta-carotene solution (10% active) | 3.0 g |
| Lycopene solution (5% active) | 2.4 g |

-continued

| Carotenoid content from all ingredients, ppm by weight of total lipids | |
| --- | --- |
| Beta-carotene | 3.0 ppm |
| Lutein | 5.0 ppm |
| Lycopene | 1.2 ppm |

1 premix per g: 375 mg/g niacinamide, 242 mg/g calcium pantothenate, 8.4 gm/g folic acid, 62 mg/g thiamine chloride hydrochloride, 48.4 gm/g riboflavin, 59.6 mg/g pyridoxine hydrochloride, 165 mcg/g cyanocobalamin and 7305 mcg/g biotin
2 premix per g: 8130 IU/g vitamin D3, 838 IU/g vitamin E, 1.42 mg/g vitamin K1
3 premix per g: 45.6 mg/g zinc, 54 mg/g iron, 15.7 manganese, 6.39 mg/g copper, 222 mcg/g selenium, 301 mcg/g chromium and 480 mcg/g molybdenum The exemplified flavored liquid is generally prepared by making at least three separate slurries, which are then blended together, heat treated, standardized, packaged and sterilized. Initially, a carbohydrate-mineral slurry is prepared by dissolving lactose in water at 65–71° C., followed by the addition of potassium citrate and the ultra trace mineral/trace mineral (UTM/TM) premix (distributed by Fortitech, Schnectady, N.Y.), all with agitation until minerals are completely dispersed. Magnesium chloride, potassium chloride, chloride, sodium citrate, potassium iodide, magnesium phosphate and tricalcium phosphate are then added to the slurry with agitation. Maltodextrin (Grain Processing Corporation, Muscataine, Iowa, U.S.A.), sucrose and corn syrup are then added under high agitation until dissolved. The resulting carbohydrate-mineral slurry is held with agitation at 65–7° C. for not longer than eight hours until it is blended with the other prepared slurries.

A protein-fat slurry is prepared by combining high oleic safflower oil and canola oil at 40.5–49° C. with agitation. Free lutein (Kemin Foods of Des Moines, Iowa) is then added and the mixture agitated for a least 15 minutes. Lecithin (distributed by Central Soya Company, Fort Wayne, Ind.), vitamin A, and the Vitamin D, E, K premix (distributed by Vitamins Inc., Chicago, Ill.) are then added with agitation. Carrageenan is then dry blended with whey protein, and the resulting dry mix added with agitation to the forming slurry, which is then allowed to agitate for at least 10 minutes. Soy protein is added to the blend slowly to assure proper mixing. The resulting protein-oil slurry is held under moderate agitation at 40–43° C. for a no longer than two hours until it is blended with the other formed slurries.

A protein-water slurry is prepared by adding caseinate to water at 40° C. with agitation until the caseinate is completely dispersed. With continued agitation, the slurry is slowly warmed to 60–65° C. The slurry is held for no longer than twelve hours until it is blended with the other formed slurries.

The protein-water slurry is c combined with the carbohydrate-mineral slurry and allowed to agitate for 10 minutes. The protein-fat slurry is added and the mixture agitated for at least 10 minutes. The pH of the blended batch is adjusted to 6.66–6.75 with 1N potassium hydroxide.

After waiting for a period of not less than one minute nor greater than two hours, the blend slurry is heated to a temperature from 71–82° C. and dearated under vacuum, emulsified through a single stage homogenizer at 900–1100 psig, and then heated at 99–110° C. and then heated further at 146° C. for about 5 seconds. The heated slurry is passed through a flash cooler to reduce the temperature to 99–110° C. and then through a plate cooler to further reduce the temperature to 71–76° C. The cooled slurry is then homogenized at 3900–4100/400–600 psig, held at 74–80° C. for 16 seconds, and then cooled to 1–7° C. Samples are taken for microbiological and analytical testing. The mixture is held under agitation.

A water soluble vitamin (WSV) solution is prepared separately and added to the homogenized blend. The vitamin solution is prepared by adding the following ingredients to 9.4 kg of water with agitation: WSV premix (distributed by J.B. Laboratories, Holland, Mich.), vitamin C, choline chloride, L-carnitine, taurine, inositol, folic acid, pyridoxine hydrochloride and cyanocobalamin. The pH of the slurry is adjusted to 7–10 using a 45% potassium hydroxide solution.

Based on the analytical results of the quality control tests, an appropriate amount of water is added to the batch with agitation to achieve the desired total solids. Additionally, 8.8 kg of vitamin solution is added to the diluted batch under agitation. The product pH may be adjusted to achieve optimal product stability. The completed product is then placed in suitable containers and subjected to terminal sterilization.

Experiment

A study was conducted to evaluate the antioxidant capability of several oil blends and powdered nutritional product formulations containing varying amounts of conventional beta-carotene-containing antioxidant formulations, as well as nutritional formulas of the present invention containing select combinations of lycopene, lutein, and beta-carotene.

Formulations were evaluated for oxidative stability in accordance with the methods and values described hereinafter. These include oil blend peroxide values (peroxide oil value, POV), an oxidative stability index (OSI), and a conventional sensory evaluation for rancid oils. Formulations containing the different oil blends are also evaluated for color performance by Agstron and Hunter readings.

Peroxide Oil Value (POV)

Measurement of peroxide formation in oil systems is a widely used assay for the analysis of oxidation. Peroxides are primary products of lipid oxidation, and the measurement of their formation can be used as an assessment of the ability of the oil system to resist oxidation.

In this particular experiment, three oil samples were evaluated for oxidative stability. Each contained approximately 41% high oleic safflower oil, 29% soy oil, 28% coconut oil, 0.5% DHA oil and 1% ARA oil, by weight. Each oil sample also contained either 12 ppm beta-carotene (Sample A), 2.11 ppm beta-carotene (Sample C), or 2.11 ppm of a carotenoid blend comprising lutein, beta-carotene, and lycopene at a 1:1:0.6 weight ratio (Sample B). Each sample was held at 60° C. for five days under constant stirring and sampled daily for peroxide content. The results are summarized and illustrated in FIG. 1.

Figure 2:
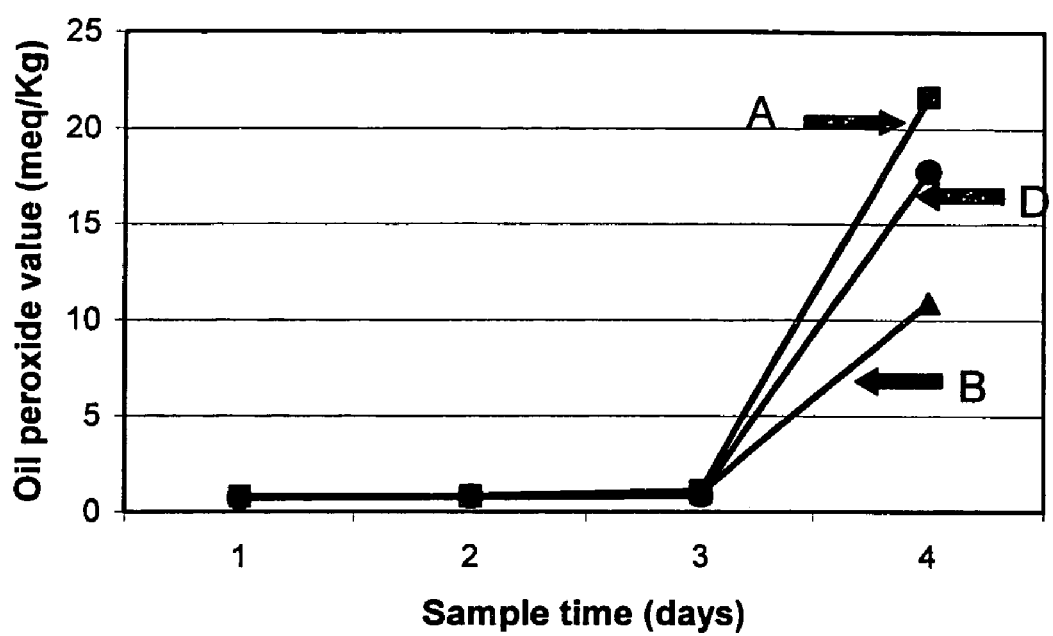
FIG. 2 is also a graph illustrating oxidative stability data from the oil blend peroxide experiment, except that this data was generated under more rigorous test conditions as described hereinafter. Line "A" represents the oil sample containing 12 ppm beta-carotene, line "B" represents the oil sample containing 2.11 ppm of a carotenoid blend comprising lutein, beta-carotene, and lycopene, and line "D" represents an oil sample blank containing no carotenoids.

In a related experiment, Samples A and B were evaluated for oxidative stability under more rigorous conditions conducive to further oxidation and peroxide formation. A control or blank sample (Sample D) was also evaluated that contained the same oil base used in Samples A and B, except that Sample D contained no carotenoids. Each sample was heated to 60° C. for four days with a constant stream of air (~21% oxygen) bubbling through each sample. Samples were tested daily for peroxide content. Results are summarized and illustrated in FIG. 2.

The data from both experiments shows that the oil system containing 2.11 ppm of the carotenoid blend was as effective as the oil system containing 12 ppm of beta-carotene in resisting peroxide formation and oxidation. The data also shows that the carotenoid blend at 2.11 ppm was even more effective than beta-carotene at 2.11 ppm in resisting peroxide formation and oxidation (see FIGS. 1 and 2).

Oxidative Stability Index

The oxidative stability index (OSI) is directed to a method for determining the ability of an oil to resist oxidation. Oil samples are exposed to heat and a constant flow of air. As the ability of the oil to resist oxidation is overcome, a rapid increase in the production of oxidation products (volatile organic acids) occurs. The organic acids are dissolved in a collection tube containing deionized water. The organic acids increase the conductivity of the water, as measured by an electrode. A plot is generated and an OSI value calculated for each sample, which then correlates with the amount of time in hours the sample resisted excessive oxidation.

Figure 3:
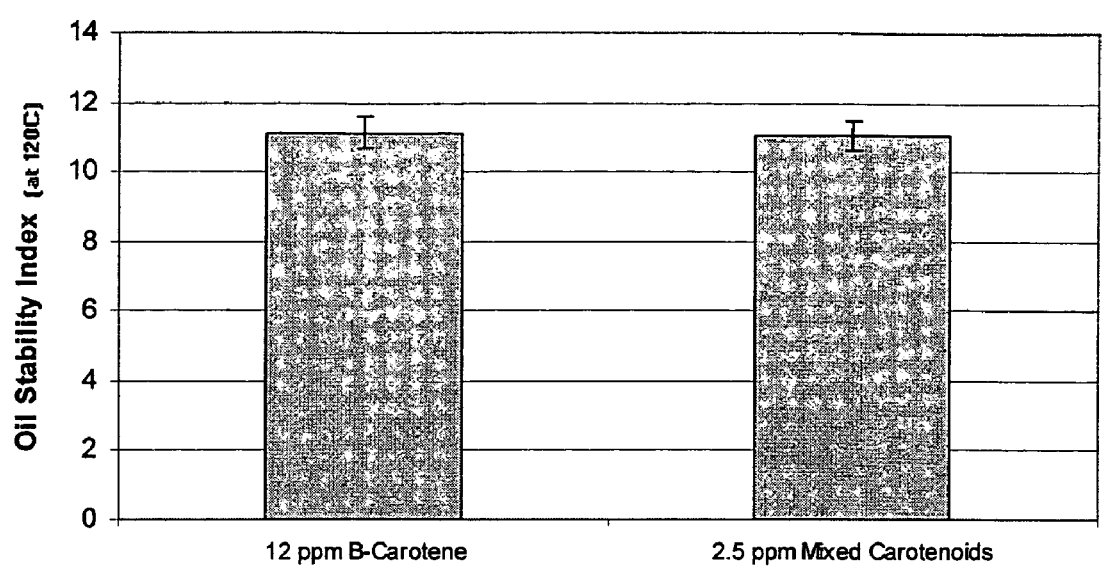
FIG. 3 is a bar chart illustrating oxidative stability data for the oil blends tested in accordance with the oxidative stability index (OSI) experiment described hereinafter, for oil blends comprising either 12 ppm beta-carotene, 2.5 ppm beta-carotene, 2.5 ppm of a carotenoid blend comprising lutein, beta-carotene, and lycopene, or no carotenoids.

In this particular experiment, two oil samples were tested using an OSI instrument (Omnion Inc., Rockland, Mass., U.S.A.) at 120° C. with an air-flow corresponding to 5.5 psi (40 Kpa). Each sample contained approximately 41% high oleic safflower oil, 29% soy oil, 28% coconut oil, 0.5% DHA oil, 1.0% ARA oil, and an antioxidant system comprising 1200 ppm ascorbyl palmitate and 400 ppm mixed tocopherols, all by weight of the oil sample. One of the two samples also contained 12 ppm beta-carotene (Sample E) while the other contained 2.5 ppm of a carotenoid blend (lycopene, lutein, beta-carotene; 1:1:0.6 weight ratio). Samples were run in triplicate. The results are summarized and illustrated in FIG. 3.

The data from this particular experiment shows that the oil system containing 2.5 ppm of the carotenoid blend was as effective as the oil system containing 12 ppm of beta-carotene in protecting against oxidation under the study conditions. The sample containing 12 ppm beta-carotene has an average OSI value of 11.13 (RSD=2.3%) while the sample containing 2.5 ppm of the carotenoid blend has an average OSI value of 11.07 (RSD=1.9%) (see FIG. 3).

Sensory Evaluation

Sample oils are also subjected to sensory evaluation to detect off-flavors and odors consistent with the generation of rancid or oxidized oils. In this particular experiment, milk-based nutritional powders are evaluated, each of which contain (by weight) approximately 28.5% fat (includes 0.15% DHA, 0.40% ARA), 12.0% protein, and 57% carbohydrate. The sample powders also contain either 0.076 ppm beta-carotene (Sample F), 0.076 ppm of a carotenoid blend comprising lycopene, lutein, and beta-carotene in a 1:1:0.6 weight ratio (Sample G), or non carotenoids (Sample H). Each product is held at 37° C. and evaluated by a trained sensory panel over a 4-week period. Sensory test results for each of the evaluated powder samples are set forth in the following table:

| VARIABLE | Week 0 | Week 1 | Week 2 | Week 4 |
| --- | --- | --- | --- | --- |
| No carotenoids | 0 | 0, very slight fish, very slight egg | 0, very slight egg | 0, moderate degraded fish |
| Beta-carotene 0.076 ppm | 0 | 0 very slight fish | 1 | 1, slight fish |
| Carotenoid blend 0.076 ppm | very slight fish | 0, very slight fish | 0, slight fish | 0, slight fish |

As shown in the above data table, powder formula variables show differentiated off-note and oxidation product development patterns consistent with the peroxide value and OSI results from the oil blends described hereinbefore. The numerical score associated with each sensory result as set forth in the table are intensity descriptors of typical oxidation products that develop in this product type. The verbal descriptors assigned to each sensory evaluation have not been directly correlated to lipid oxidation, but are closely related to consumer acceptance.

As shown in above data table, the nutritional powder containing no carotenoids displayed accelerated off-flavor development over the four-week test period, to result in a product with an unacceptable flavor profile. The product containing only beta-carotene developed off-flavors that are associated with lipid oxidation. The product containing the carotenoid blend (lycopene, lutein, beta-carotene) developed only slight off-flavors.

The sensory data is consistent with the above-described peroxide value data, and show that an oil blend containing a mixture of the lycopene, lutein, and beta-carotene as described herein is able to protect the lipid fraction of a powdered nutritional product better than beta-carotene alone under the above-described conditions.

Color Characteristics

Powder nutritional formulas are evaluated for relative color characteristics by Agtron and Hunter readings. An Agtron 45 color measurement is used to measure the reflected energy (light) from the surface of each sample product. The more reflective or lighter in color the product surface, the higher the Agtron score. By the Hunter method, a Hunter color-difference meter is used to measure product hue numerically; red is expressed as +a, green as −a, yellow as +b, and blue as −b; chroma, which indicates how black or white a sample, is, is calculated by the formulation $(a2+b2)^{1/2}$.

In this particular experiment, four nutritional powders (Samples I, J, K, L) are evaluated for color performance. Each comprises a conventional infant formula base, except that each also comprises either beta-carotene 0.42 ppm (Sample I), beta-carotene 0.076 ppm (Sample J), a carotenoid blend at 0.076 ppm comprising a 1:1:0.6 weight ratio of lycopene, lutein, and beta-carotene (Sample K), or no carotenoids (Sample L). The results are set forth in the following table:

| | Sample | Variable | Hunter A | Hunter B | Hunter L | EΔhunter | Agtron |
| --- | --- | --- | --- | --- | --- | --- | --- |
| Powder | I | Beta-carotene 0.42 ppm | −1.8 | 21.8 | 86.5 | Reference | 53 |
| | J | Beta-carotene 0.076 ppm | −2.2 | 18.7 | 86.1 | 3.15 | 56.2 |
| | K | Carotenoid blend 0.076 ppm | −2.5 | 18 | 86.7 | 3.87 | 59.3 |
| | L | No carotenoids | — | — | — | — | 64.7 |

Color Performance Data

-continued

Color Performance Data

| | Sample | Variable | Hunter A | Hunter B | Hunter L | EΔhunter | Agtron |
|---|---|---|---|---|---|---|---|
| Reconstituted | I | Beta-carotene 0.42 ppm | −1.9 | 13 | 82.1 | Reference | — |
| | J | Beta-carotene 0.076 ppm | −1.9 | 10 | 83.3 | 3.23 | — |
| | K | Carotenoid blend 0.076 ppm | −2.2 | 10 | 82.8 | 3.1 | — |
| | L | No carotenoids | — | — | — | — | — |

As shown in above-data table, powder and reconstituted formulas containing the carotenoid blend (Sample K) have a less red color as measured by Hunter A values and less yellow color as measured by Hunter B values, as compared to the formulas containing only beta-carotene at either 0.076 or 0.42 ppm as fed. It can also be seen from the Agtron scores that the formulas containing the carotenoid blend (Sample K) have an overall lighter appearance (higher Agtron score) than either Samples I and J which contain only beta-carotene at 0.076 and 0.42 ppm, respectively.

CONCLUSION

The data as set forth herein shows that nutritional formulas containing the carotenoid blend of the present invention are at least as effective as an antioxidant system comprising beta-carotene as the sole carotenoid. Moreover, the data also shows that the carotenoid blend of the present invention can be formulated at reduced concentrations for better overall color performance, without compromising the antioxidant performance that would otherwise be provided by much higher concentrations of just beta-carotene alone.

What is claimed is:

1. A nutritional formula comprising
   (A) carbohydrate,
   (B) protein;
   (C) lipid containing a polyunsaturated fatty acid; and
   (D) from about 0.25 to about 11 ppm, by weight of the total oil content of the nutritional formula, of a combination of lutein, lycopene, and beta-carotene at the following weight ratios:
       (i) lutein to beta-carotene of from about 0.0196:1 to about 59:1,
       (ii) lycopene to beta-carotene of from about 0.00805:1 to about 114:1, and
       (iii) lutein to lycopene of from about 0.0117:1 to about 108:1.

2. The nutritional formula of claim 1 wherein the formula comprises the following weight ratios:
   (i) lutein to beta-carotene of from about 0.1:1 to about 40:1,
   (ii) lycopene to beta-carotene of from about 0.01:1 to about 60:1, and
   (iii) lutein to lycopene of from about 0.05:1 to about 70:1.

3. The nutritional formula of claim 1 wherein the formula comprises the following weight ratios:
   (i) lutein to beta-carotene of from about 0.1:1 to about 10:1,
   (ii) lycopene to beta-carotene of from about 0.1:1 to about 10:1, and
   (iii) lutein to lycopene of from about 0.1:1 to about 10:1.

4. The nutritional formula of claim 1 wherein the combination of lutein, lycopene, and beta-carotene comprises from about 0.5 to about 8 ppm by weight of the total oil content of the nutritional formula.

5. The nutritional formula of claim 1 wherein the combination of lutein, lycopene, and beta-carotene comprises from about 1 to about 3 ppm by weight of the total oil content of the nutritional formula.

6. The nutritional formula of claim 1 wherein the formula comprises by weight of the total oil content of the formula from about 0.1 to about 5.16 ppm of lutein, from about 0.1 to about 9.8 ppm of lycopene, and from about 0.1 to about 5.9 ppm of beta-carotene.

7. The nutritional formula of claim 1 wherein the formula comprises by weight of the total oil content of the formula from about 0.5 to about 2.5 ppm of lutein, from about 0.2 to about 5 ppm of lycopene, and from about 0.1 to about 4 ppm of beta-carotene.

8. The nutritional formula of claim 1 wherein the polyunsaturated fatty acid represents from about 0.05% to about 20% by weight of total formula solids.

9. The nutritional formula of claim 8 wherein the polyunsaturated fatty acid comprises one or more of decosahexaenoic acid, eicosapentaenoic acid, arachidonic acid, linoleic acid, linolenic acid, or combinations thereof.

10. The nutritional formula of claim 8 wherein the polyunsaturated fatty acid comprises decosahexaenoic acid.

11. The nutritional formula of claim 8 wherein the formula further comprises a combination of decosahexaenoic acid and arachidonic acid.

12. A method of providing nutrition to an infant, child, or adult, said method comprising administering to an infant, child, or adult the formula of claim 1.

13. A powder infant formula comprising
    (A) carbohydrate,
    (B) protein;
    (C) lipid containing a polyunsaturated fatty acid; and
    (D) from about 0.25 to about 10 ppm, the total oil content of the formula, of a combination from the group consisting essential of lutein, lycopene, and beta-carotene at the following weight ratios:
        (i) lutein to beta-carotene of from about 0.0196:1 to about 59:1,
        (ii) lycopene to beta-carotene of from about 0.00805:1 to about 114:1, and
        (iii) lutein to lycopene of from about 0.0117:1 to about 108:1,
    wherein the formula is a powder nutritional formula.

14. The nutritional formula of claim 13 wherein the formula comprises the following weight ratios:
    (i) lutein to beta-carotene of from about 0.1:1 to about 10:1,
    (ii) lycopene to beta-carotene of from about 0.1:1 to about 10:1, and
    (iii) lutein to lycopene of from about 0.1:1 to about 10:1.

15. The nutritional formula of claim 13 wherein the combination of lutein, lycopene, and beta-carotene comprises from about 0.5 to about 8 ppm by weight of the total oil content of the nutritional formula.

16. The nutritional formula of claim 13 wherein the combination of lutein, lycopene, and beta-carotene comprises from about 1 to about 3 ppm by weight of the total oil content of the nutritional formula.

17. The nutritional formula of claim 13 wherein the formula comprises by weight of the total oil content of the nutritional formula from about 0.1 to about 5.16 ppm of lutein, from about 0.1 to about 9.8 ppm of lycopene, and from about 0.1 to about 5.9 ppm of beta-carotene.

18. The nutritional formula of claim 13 wherein the formula comprises by weight of the total oil content of the nutritional formula from about 0.5 to about 2.5 ppm of lutein, from about 0.2 to about 5 ppm of lycopene, and from about 0.1 to about 4 ppm of beta-carotene.

19. The nutritional formula of claim 13 wherein the polyunsaturated fatty acid represents from about 0.05% to about 20% by weight of total formula solids.

20. The nutritional formula of claim 19 wherein the polyunsaturated fatty acid comprises one or more of decosahexaenoic acid, eicosapentaenoic acid, arachidonic acid, linoleic acid, linolenic acid, or combinations thereof.

21. The nutritional formula of claim 19 wherein the polyunsaturated fatty acid comprises decosahexaenoic acid.

22. The nutritional formula of claim 19 wherein the formula further comprises a combination of decosahexaenoic acid and arachidonic acid.

23. The infant formula of claim 22 wherein the polyunsaturated fatty acid represents from about 0.05% to about 15% by weight of total formula solids.

24. The infant formula of claim 23 wherein the polyunsaturated fatty acid comprises one or more of decosahexaenoic acid, eicosapentaenoic acid, arachidonic acid, linoleic acid, linolenic acid, or combinations thereof.

25. The infant formula of claim 23 wherein the polyunsaturated fatty acid comprises decosahexaenoic acid.

26. The infant formula of claim 23 wherein the formula further comprises a combination of decosahexaenoic acid and arachidonic acid.

27. A method of providing nutrition to an infant, child, or adult, said method comprising reconstituting the formula of claim 13 with water to form a ready-to-feed liquid, and then feeding the infant, child, or adult with the reconstituted formula.

28. An infant formula comprising
  (A) carbohydrate,
  (B) protein;
  (B) lipid containing arachidonic acid and decosahexaenoic acid; and
  (C) from about 0.25 to about 10 ppm of a combination from the group consisting essentially of lutein, lycopene, and beta-carotene, by weight of the total oil content of the infant formula.

29. The infant formula of claim 28 wherein the combination of lutein, lycopene, and beta-carotene represents from about 0.5 to about 8 ppm of the total oil content of the infant formula.

30. The infant formula of claim 28 wherein the combination of lutein, lycopene, and beta-carotene represents from about 1 to about 3 ppm of the total oil content of the infant formula.

31. The infant formula of claim 28 wherein the formula comprises, by weight of the total oil content of the infant formula, from about 0.1 to about 5.16 ppm of lutein, from about 0.1 to about 9.8 ppm of lycopene, and from about 0.1 to about 5.9 ppm of beta-carotene.

32. The infant formula of claim 28 wherein the formula comprises, by weight of the total oil content of the infant formula, from about 0.5 to about 2.5 ppm of lutein, from about 0.2 to about 5 ppm of lycopene, and from about 0.1 to about 4 ppm of beta-carotene.

33. The infant formula of claim 28 wherein the formula is in powder form.

34. A method of providing nutrition to an infant, said method comprising reconstituting the formula of claim 33 with water to form a ready-to-feed liquid, and then feeding the infant with the reconstituted formula.

35. The infant formula of claim 28 wherein the formula is in liquid form.

36. A method of providing nutrition to an infant, said method comprising administering to an infant the formula of claim 28.

* * * * *

(12) EX PARTE REEXAMINATION CERTIFICATE (10239th)
United States Patent
Albrecht et al.

(10) Number: US 7,090,879 C1
(45) Certificate Issued: Aug. 4, 2014

(54) NUTRITIONAL FORMULA CONTAINING SELECT CAROTENOID COMBINATIONS

(75) Inventors: Daniel S. Albrecht, Columbus, OH (US); Nancy Auestad, Powell, OH (US); Jeffrey M. Boff, Dubin, OH (US); Amy Mackey, Columbus, OH (US)

(73) Assignee: Abbott Laboratories, Abbott Park, IL (US)

Reexamination Request:
No. 90/012,753, Dec. 26, 2012

Reexamination Certificate for:
Patent No.: 7,090,879
Issued: Aug. 15, 2006
Appl. No.: 10/803,485
Filed: Mar. 18, 2004

(51) Int. Cl.
*A23L 1/303* (2006.01)
*A23L 1/29* (2006.01)
*A23L 1/30* (2006.01)
*A23L 1/304* (2006.01)
*A23L 1/302* (2006.01)
*A23L 2/39* (2006.01)

(52) U.S. Cl.
CPC ............... *A23L 1/296* (2013.01); *A23L 1/3006* (2013.01); *A23L 1/304* (2013.01); *A23L 1/302* (2013.01); *Y10S 426/801* (2013.01); *A23V 2002/00* (2013.01); *A23V 2250/704* (2013.01); *A23V 2250/211* (2013.01); *A23V 2250/1868* (2013.01); *A23L 1/3008* (2013.01); *A23L 1/3002* (2013.01); *A23L 2/39* (2013.01); *A23V 2250/1862* (2013.01); *A23V 2250/70* (2013.01); *A23V 2250/156* (2013.01); *A23V 2250/213* (2013.01)
USPC ............... 426/72; 426/262; 426/601; 426/73; 426/801

(58) Field of Classification Search
None
See application file for complete search history.

(56) References Cited

To view the complete listing of prior art documents cited during the proceeding for Reexamination Control Number 90/012,753, please refer to the USPTO's public Patent Application Information Retrieval (PAIR) system under the Display References tab.

*Primary Examiner* — Elizabeth McKane

(57) ABSTRACT

Disclosed are nutritional formulas, including reconstitutable powders, comprising carbohydrate, protein and a lipid component containing a polyunsaturated fatty acid; and from about 0.25 to about 10 ppm, by weight of the total oil content of the infant formula, of a combination of lutein, lycopene, and beta-carotene with preferred weight ratios of the lutein to beta-carotene of from about 0.0196:1 to about 59:1, the lycopene to beta-carotene of from about 0.00805:1 to about 114:1, and the lutein to lycopene of from about 0.0117:1 to about 108:1. Also disclosed are methods of providing nutrition using the disclosed formulas. The nutritional formulas provide improved product stability and color characteristics.

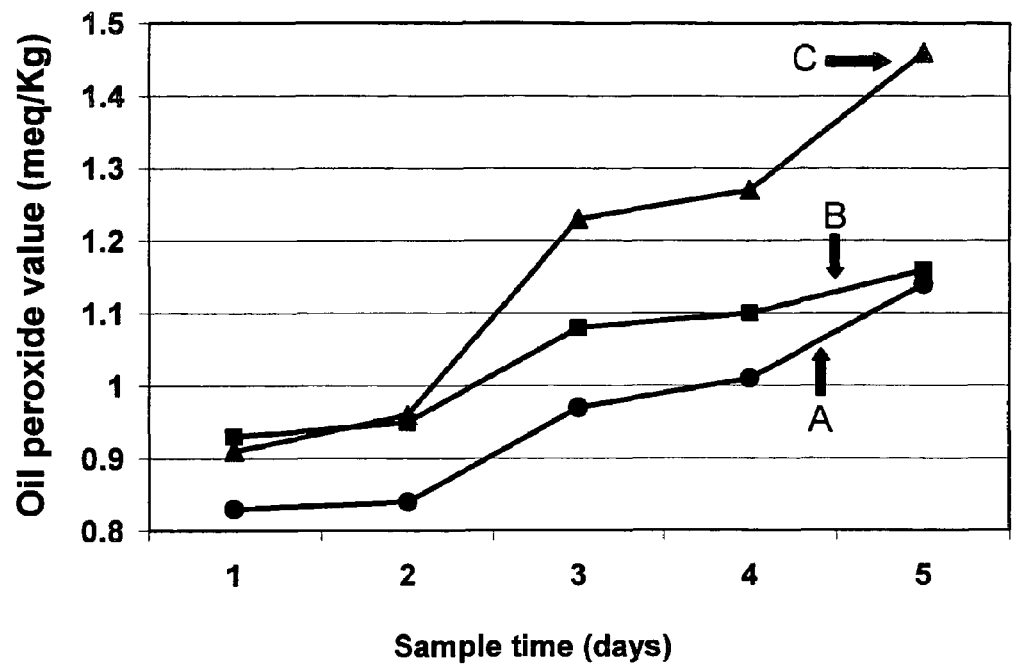

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1 lines 32-44:

Many nutritional formulas, especially infant formulas, commonly contain a variety of polyunsaturated chain fatty acids (PUFA) as part of the lipid component of the overall nutrient system, examples of which include linoleic acid, alpha-linolenic acid, eicosapentaenoic acid (EPA), arachidonic acid (ARA), [decosahexaenoic] *docosahexaenoic* acid (DHA), and others. A growing body of evidence even suggests the intake of certain long chain polyunsaturated fatty acids may be beneficial or even essential for certain groups. For example, some PUFAs have been shown beneficial in the prevention and management of cardiovascular disease, rheumatoid arthritis, asthma, other inflammation related diseases, and cancer cachexia.

Column 1, lines 45-52:

Arachidonic and [decosahexaenoic] *docosahexaenoic* acids in particular have been shown to provide beneficial effects in preterm infants such as enhanced brain and vision development, and are now commonly found in many commercially available infant formulas such as Similac® Advance® Infant Formula and Isomil® Advance® Infant formula, both of which are available from Ross Products Division, Abbott Laboratories, Columbus, Ohio, USA.

Column 1, lines 53-Column 2, line 3:

These polyunsaturated fatty acids, however, tend to be more sensitive to oxidation than many other ingredients commonly found in nutritional formulas. Due to their chemical structure, exposure to heat and atmospheric levels of oxygen can cause a series of chemical reactions about their carbon:carbon double bonds resulting in free radical formation. These free radicals can continue to break down the polyunsaturated fatty acids in an auto-oxidative process. The result is the development of undesirable off-flavors and odors and the eventual degradation of the beneficial polyunsaturated fatty acids. These polyunsaturated fatty acids are especially susceptible to oxidation during high-heat processing, spray drying processing, or even during relatively short storage periods after the formula has been sealed and packaged. Oxidative stability has become especially challenging with recent infant formulas that contain relatively high concentrations of arachidonic and [decosahexaenoic] *docosahexaenoic* acid for optimal eye and cognitive development.

Column 2, line 49-62:

It is therefore an object of the present invention to provide nutritional formulas, especially infant formulas, containing a polyunsaturated fatty acid with an effective antioxidant system, and further to provide such a system that contains a carotenoid-containing antioxidant. It is a further object of the present invention to provide such a formula, wherein the formula has improved color, with little or no red-orange carotenoid hue. It is yet another object of the present invention to provide such a formula containing relatively high concentrations of polyunsaturated fatty acids, especially a combination including arachidonic, eicosapentaenoic, and/or [decosahexaenoic] *docosahexaenoic* acids. It is a further object of the present invention to provide such benefits in a powder nutritional formula.

Column 3, line 9-16:

The present invention is also directed to a nutritional formula, including a powder nutritional formula, comprising carbohydrate, protein, and lipid, wherein the lipid contains arachidonic acid, linoleic acid, linolenic acid, eicosapentaenoic acid, [decosahexaenoic] *docosahexaenoic* acid, or combinations thereof; and from about 0.25 to about 10 ppm, by weight of the total oil content of the formula, of a combination of lutein, lycopene, and beta-carotene.

AS A RESULT OF REEXAMINATION, IT HAS BEEN DETERMINED THAT:

Claims 8, 10, 11, 19, 21, 22, 25 and 26 are cancelled.

Claims 1, 9, 13-18, 20, 23, 24, 27 and 28 are determined to be patentable as amended.

Claims 2-7, 12 and 29-36, dependent on an amended claim, are determined to be patentable.

New claims 37-47 are added and determined to be patentable.

1. A nutritional formula comprising:
   (A) carbohydrate[,];
   (B) protein;
   (C) lipid containing a polyunsaturated fatty acid; and
   (D) from about 0.25 to about 11 ppm, by weight of the total oil content of the nutritional formula, of a combination of lutein, lycopene, and beta-carotene at the following weight ratios:
      (i) lutein to beta-carotene of from about 0.0196:1 to about 59:1[.];
      (ii) lycopene to beta-carotene of from about 0.00805:1 to about 114:1[.]; and
      (iii) lutein to lycopene of from about 0.0117:1 to about 108:1;
   *wherein the polyunsaturated fatty acid represents from about 0.05% to about 20% by weight of total formula solids; and*
   *wherein arachidonic acid represents from about 0.2% to about 2% by weight of the polyunsaturated fatty acid, and docosahexaenoic acid represents from about 0.1% to about 1% by weight of the polyunsaturated fatty acid.*

9. The nutritional formula of claim [8] *1* wherein the polyunsaturated fatty acid *further* comprises one or more of [decosahexaenoic acid,] eicosapentaenoic acid, [arachidonic acid,] linoleic acid, linolenic acid, or combinations thereof.

13. A powder infant formula comprising:
(A) carbohydrate[,];
(B) protein;
(C) lipid containing a polyunsaturated fatty acid; and
(D) from about 0.25 to about 10 ppm, *by weight of* the total oil content of the formula, of a combination from the group consisting [essential] *essentially* of lutein, lycopene, and beta-carotene at the following weight ratios:
  (i) lutein to beta-carotene of from about 0.0196:1 to about 59:1[,];
  (ii) lycopene to beta-carotene of from about 0.00805:1 to about 114:1[,]; and
  (iii) lutein to lycopene of from about 0.0117:1 to about 108:1[,];
wherein the polyunsaturated fatty acid represents from about 0.05% to about 20% by weight of total formula solids;
wherein arachidonic acid represents from about 0.2% to about 2% by weight of the polyunsaturated fatty acid, and docosahexaenoic acid represents from about 0.1% to about 1% by weight of the polyunsaturated fatty acid; and
wherein the formula is a powder nutritional formula.

14. The [nutritional] *infant* formula of claim 13 wherein the formula comprises the following weight ratios:
  (i) lutein to beta-carotene of from about 0.1:1 to about 10:1,
  (ii) lycopene to beta-carotene of from about 0.1:1 to about 10:1, and
  (iii) lutein to lycopene of from about 0.1:1 to about 10:1.

15. The [nutritional] *infant* formula of claim 13 wherein the combination of lutein, lycopene, and beta-carotene comprises from about 0.5 to about 8 ppm by weight of the total oil content of the [nutritional] *infant* formula.

16. The [nutritional] *infant* formula of claim 13 wherein the combination of lutein, lycopene, and beta-carotene comprises from about 1 to about 3 ppm by weight of the total oil content of the [nutritional] *infant* formula.

17. The [nutritional] *infant* formula of claim 13 wherein the formula comprises by weight of the total oil content of the [nutritional] *infant* formula from about 0.1 to about 5.16 ppm of lutein, from about 0.1 to about 9.8 ppm of lycopene, and from about 0.1 to about 5.9 ppm of beta-carotene.

18. The [nutritional] *infant* formula of claim 13 wherein the formula comprises by weight of the total oil content of the [nutritional] *infant* formula from about 0.5 to about 2.5 ppm of lutein, from about 0.2 to about 5 ppm of lycopene, and from about 0.1 to about 4 ppm of beta-carotene.

20. The [nutritional] *infant* formula of claim [19] *13* wherein the polyunsaturated fatty acid *further* comprises one or more of [decosahexaenoic acid,] eicosapentaenoic acid, [arachidonic acid,] linoleic acid, linolenic acid, or combinations thereof.

23. The infant formula of claim [22] *13* wherein the polyunsaturated fatty acid represents from about 0.05% to about 15% by weight of total formula solids.

24. The infant formula of claim 23 wherein the polyunsaturated fatty acid comprises one or more of [decosahexaenoic acid,] eicosapentaenoic acid, [arachidonic acid,] linoleic acid, linolenic acid, or combinations thereof.

27. A method of providing nutrition to an infant[, child, or adult], said method comprising reconstituting the formula of claim 13 with water to form a ready-to-feed liquid, and then feeding the infant[, child, or adult] with the reconstituted formula.

28. An infant formula comprising:
(A) carbohydrate[,];
(B) protein;
[(B)] (C) lipid containing *a polyunsaturated fatty acid, wherein the polyunsaturated fatty acid comprises* arachidonic acid and [decosahexaenoic] *docosahexaenoic* acid; and
[(C)] (D) from about 0.25 to about 10 ppm of a combination from the group consisting essentially of lutein, lycopene, and beta-carotene, by weight of the total oil content of the infant formula;
wherein the polyunsaturated fatty acid represents from about 0.05% to about 20% by weight of total formula solids;
wherein the arachidonic acid represents from about 0.2% to about 2% by weight of the polyunsaturated fatty acid, and the docosahexaenoic acid represents from about 0.1% to about 1% by weight of the polyunsaturated fatty acid; and
wherein the infant formula is suitable for use as a sole source of nutrition for infants.

37. The nutritional formula of claim 1 wherein the combination of lutein, lycopene, and beta-carotene comprises from about 0.5 to about 8 ppm by weight of the total oil content of the nutritional formula, and the polyunsaturated fatty acid represents from about 0.2% to about 10% by weight of total formula solids.

38. The infant formula of claim 13 wherein the combination of lutein, lycopene, and beta-carotene comprises from about 0.5 to about 8 ppm by weight of the total oil content of the infant formula, and the polyunsaturated fatty acid represents from about 0.2% to about 10% by weight of total formula solids.

39. The infant formula of claim 28 wherein the combination of lutein, lycopene, and beta-carotene comprises from about 0.5 to about 8 ppm by weight of the total oil content of the infant formula, and the polyunsaturated fatty acid represents from about 0.2% to about 10% by weight of total formula solids.

40. The nutritional formula of claim 2 wherein the combination of lutein, lycopene, and beta-carotene comprises from about 0.5 to about 8 ppm by weight of the total oil content of the nutritional formula, and the polyunsaturated fatty acid represents from about 0.2% to about 10% by weight of total formula solids.

41. The nutritional formula of claim 3 wherein the combination of lutein, lycopene, and beta-carotene comprises from about 0.5 to about 8 ppm by weight of the total oil content of the nutritional formula, and the polyunsaturated fatty acid represents from about 0.2% to about 10% by weight of total formula solids.

42. The infant formula of claim 14 wherein the combination of lutein, lycopene, and beta-carotene comprises from about 0.5 to about 8 ppm by weight of the total oil content of the infant formula, and the polyunsaturated fatty acid represents from about 0.2% to about 10% by weight of total formula solids.

43. The infant formula of claim 28 wherein the polyunsaturated fatty acid represents from about 0.2% to about 10% by weight of total formula solids.

44. The infant formula of claim 28 wherein the lutein, lycopene, and beta-carotene are present at the following weight ratios:
  (i) lutein to beta-carotene of from about 0.0196:1 to about 59:1;
  (ii) lycopene to beta-carotene of from about 0.00805:1 to about 114:1; and
  (iii) lutein to lycopene of from about 0.0117:1 to about 108:1.

45. The infant formula of claim 28 wherein the lutein, lycopene, and beta-carotene are present at the following weight ratios:
  (i) lutein to beta-carotene of from about 0.1:1 to about 40:1,
  (ii) lycopene to beta-carotene of from about 0.01:1 to about 60:1, and
  (iii) lutein to lycopene of from about 0.05:1 to about 70:1.

46. The infant formula of claim 28 wherein the lutein, lycopene, and beta-carotene are present at the following weight ratios:
  (i) lutein to beta-carotene of from about 0.1:1 to about 10:1,
  (ii) lycopene to beta-carotene of from about 0.1:1 to about 10:1, and
  (iii) lutein to lycopene of from about 0.1:1 to about 10:1.

47. The infant formula of claim 28, wherein at least a majority of the caloric content of the carbohydrate is provided by a source selected from the group consisting of corn syrup, corn syrup solids, sucrose, lactose, and combinations thereof.

\* \* \* \* \*